(12) United States Patent
Nakamura

(10) Patent No.: US 8,471,947 B2
(45) Date of Patent: Jun. 25, 2013

(54) IMAGE PICKUP APPARATUS INCLUDING DUST RESISTANT WALLS

(75) Inventor: Hidekazu Nakamura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 42 days.

(21) Appl. No.: 13/029,376

(22) Filed: Feb. 17, 2011

(65) Prior Publication Data

US 2011/0205420 A1 Aug. 25, 2011

(30) Foreign Application Priority Data

Feb. 19, 2010 (JP) ................................. 2010-034243

(51) Int. Cl.
*G02B 13/16* (2006.01)
*G02B 7/28* (2006.01)
*H04N 5/225* (2006.01)
*G03B 7/099* (2006.01)
*G03B 17/00* (2006.01)

(52) U.S. Cl.
USPC ............. 348/335; 396/111; 396/118; 396/72; 396/73; 396/529

(58) Field of Classification Search
USPC ................ 348/335; 396/111, 118, 72, 79–82, 396/529–532; 359/826
See application file for complete search history.

(56) References Cited

U.S. PATENT DOCUMENTS

| 4,734,778 A | * | 3/1988 | Kobayashi | 348/374 |
| 5,416,519 A | * | 5/1995 | Ohtake | 348/351 |
| 5,838,374 A | * | 11/1998 | Kikuchi | 348/351 |
| 5,969,760 A | * | 10/1999 | Ernest et al. | 348/357 |
| 7,411,749 B2 | * | 8/2008 | Liu | 359/819 |
| 2006/0034604 A1 | * | 2/2006 | Nomura et al. | 396/349 |
| 2006/0193625 A1 | * | 8/2006 | Nomura | 396/349 |
| 2007/0223966 A1 | | 9/2007 | Fujimoto | |

FOREIGN PATENT DOCUMENTS

JP 2007-264096 A 10/2007

* cited by examiner

*Primary Examiner* — Lin Ye
*Assistant Examiner* — Chia-Wei A Chen
(74) *Attorney, Agent, or Firm* — Rossi, Kimms & McDowell LLP

(57) ABSTRACT

The image pickup apparatus includes an image taking optical system, an optical filter into which the light from the image taking optical system enters, an image pickup element electrically converting the optical image formed by the light that has passed through the optical filter, an image pickup element holding member holding the image pickup element together with the optical filter, and a lens holding member holding an image surface side lens unit disposed closest to the optical filter. The lens and image pickup element holding members are moved relatively to each other in an optical axis direction, and include dust-proof walls that surround a space between the image surface side lens unit and the optical filter and mutually overlap in a direction orthogonal to the optical axis direction in an entire range where the lens and image pickup element holding members are relatively moved.

2 Claims, 5 Drawing Sheets

IMAGE PICKUP APPARATUS INCLUDING DUST RESISTANT WALLS

BACKGROUND OF THE INVENTION

1. Field of the Invention

The present invention relates to an image pickup apparatus such as a digital camera and a video camera.

2. Description of the Related Art

Image pickup apparatuses provided with an image pickup element such as a CCD sensor or a CMOS sensor include an optical filter such as an infrared cutting filter or an optical low-pass filter disposed closer to an object than a light-receiving surface (image pickup surface) of the image pickup element. Attachment of foreign substances such as dust invading from the outside of the image pickup apparatus and abrasion powder generated at mechanical sliding surfaces inside the image pickup element onto the light-receiving surface of the image pickup element or the optical filter causes the image pickup element to capture images of the foreign substances, which may generate a captured image including the images of the foreign substances.

The attachment of the foreign substances onto the light-receiving surface of the image pickup element and an image pickup element side surface of the optical filter is often prevented by providing a dust-proof structure that surrounds a space between these surfaces. On the other hand, Japanese Patent Laid-Open No. 2007-264096 discloses a dust removing mechanism that vibrates an optical filter by using a piezoelectric element to remove foreign substances attached onto an object side surface (that is, a surface opposite to the image pickup element side surface) of the optical filter.

However, providing such a dust removing mechanism disclosed in Japanese Patent Laid-Open No. 2007-264096 complicates the configuration of the image pickup apparatus and increases the size of the image pickup apparatus.

Moreover, employing the dust removing mechanism for an image pickup apparatus in which an image pickup element unit including the image pickup element and the optical filter is moved in an optical axis direction to perform zooming or the like increases the size of a drive mechanism that moves the image pickup element unit whose weight is increased by addition of the dust removing mechanism.

SUMMARY OF THE INVENTION

The present invention provides an image pickup apparatus capable of preventing attachment of foreign substances onto the object side surface of the optical filter without complicating the configuration of the apparatus and increasing the size thereof.

The present invention provides as one aspect thereof an image pickup apparatus including an image taking optical system configured to cause light to form an optical image, an optical filter into which the light from the image taking optical system enters, an image pickup element configured to electrically convert the optical image formed by the light that has passed through the optical filter, an image pickup element holding member configured to hold the image pickup element together with the optical filter, and a lens holding member configured to hold an image surface side lens unit that is disposed closest to the optical filter among lens units included in the image taking optical system. The lens holding member and the image pickup element holding member are moved relatively to each other in an optical axis direction of the image taking optical system, and the lens holding member and the image pickup element holding member include dust-proof walls that surround a space between the image surface side lens unit and the optical filter and mutually overlap in a direction orthogonal to the optical axis direction in an entire range where the lens holding member and the image pickup element holding member are moved relatively to each other.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1:
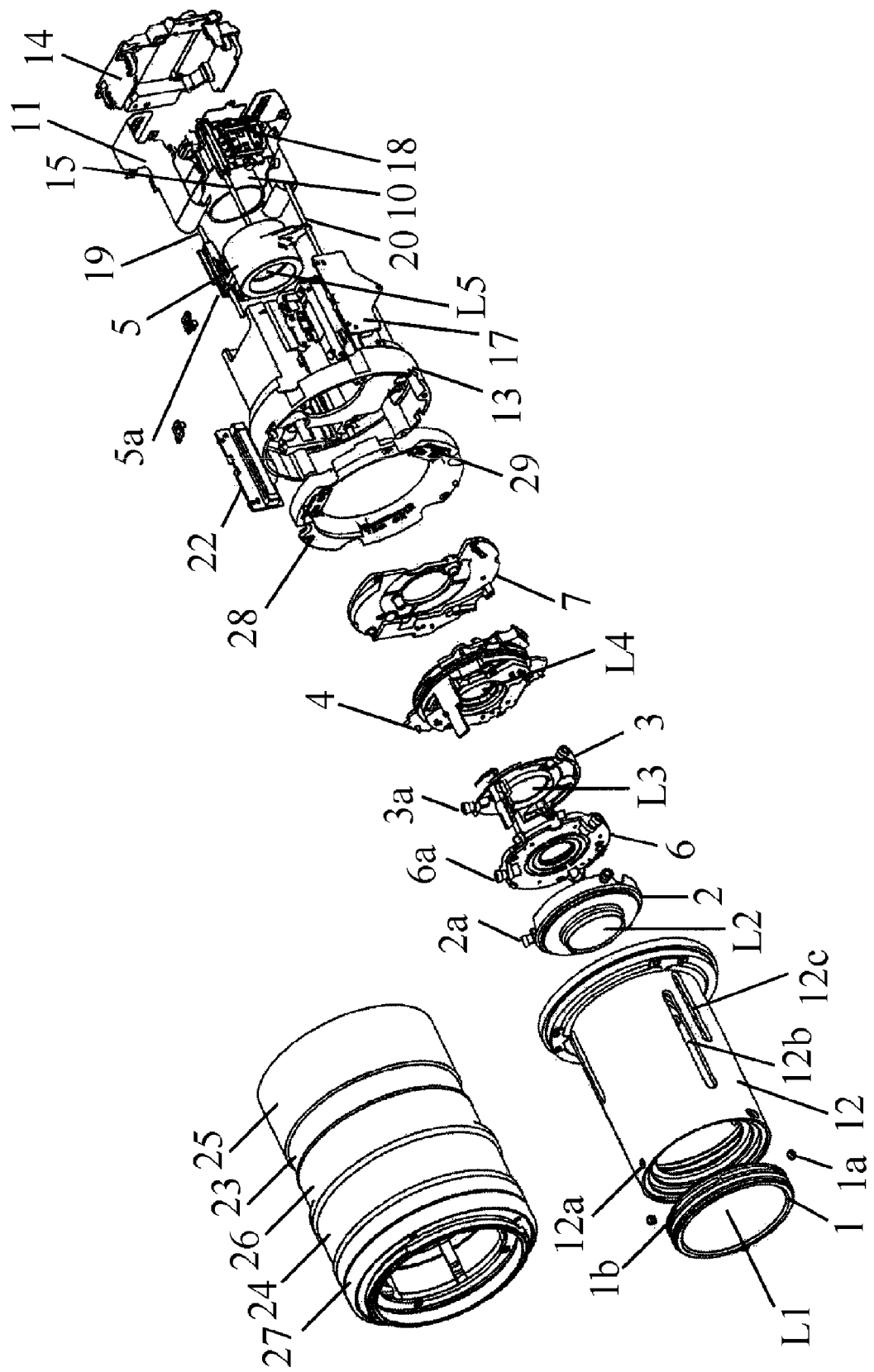
FIG. 1 is an exploded perspective view of a lens barrel part of a video camera that is an embodiment of the present invention.
Figure 2:
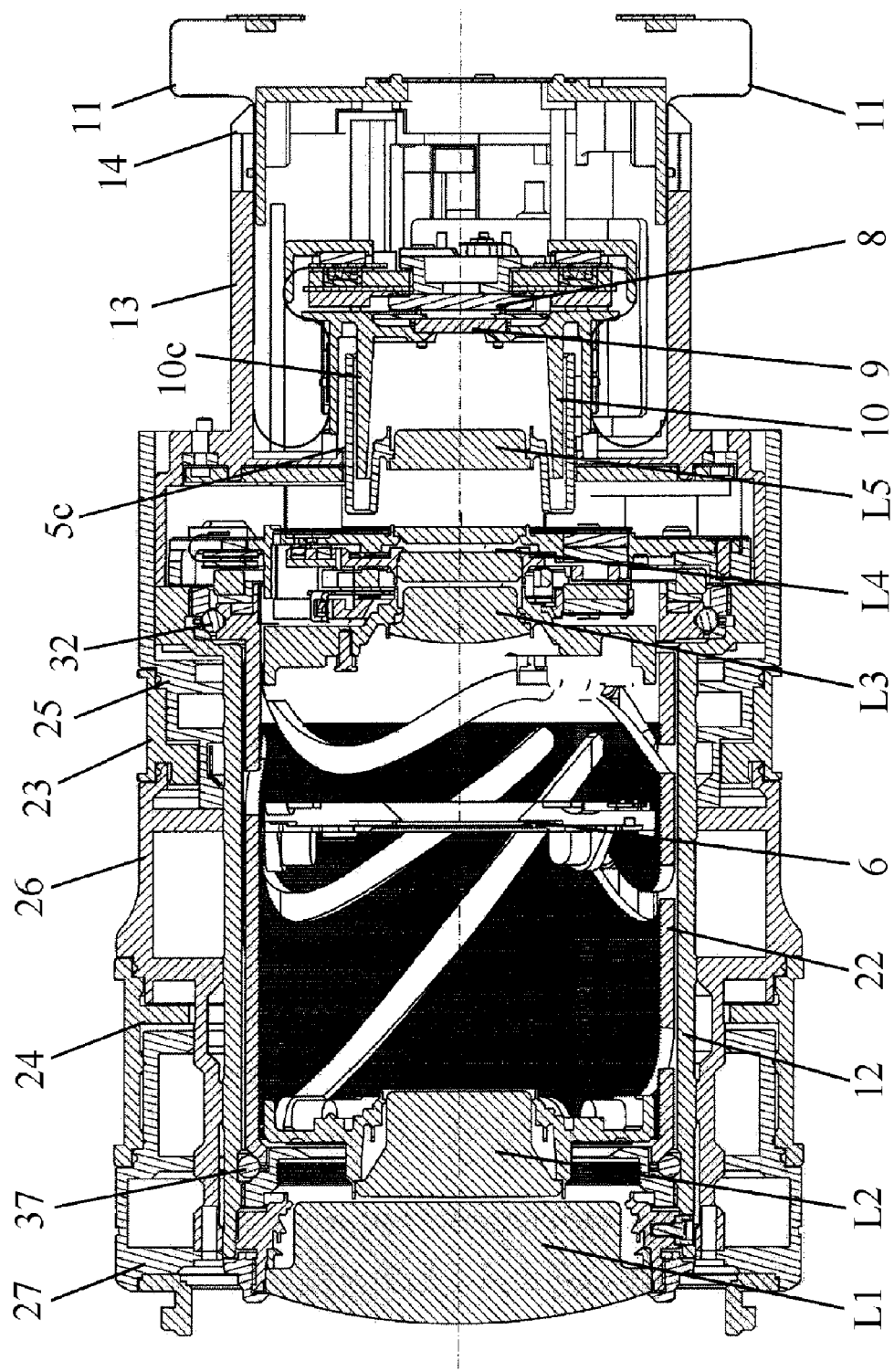
FIG. 2 is a cross-sectional view of the lens barrel part of the video camera of the embodiment.
Figure 3:
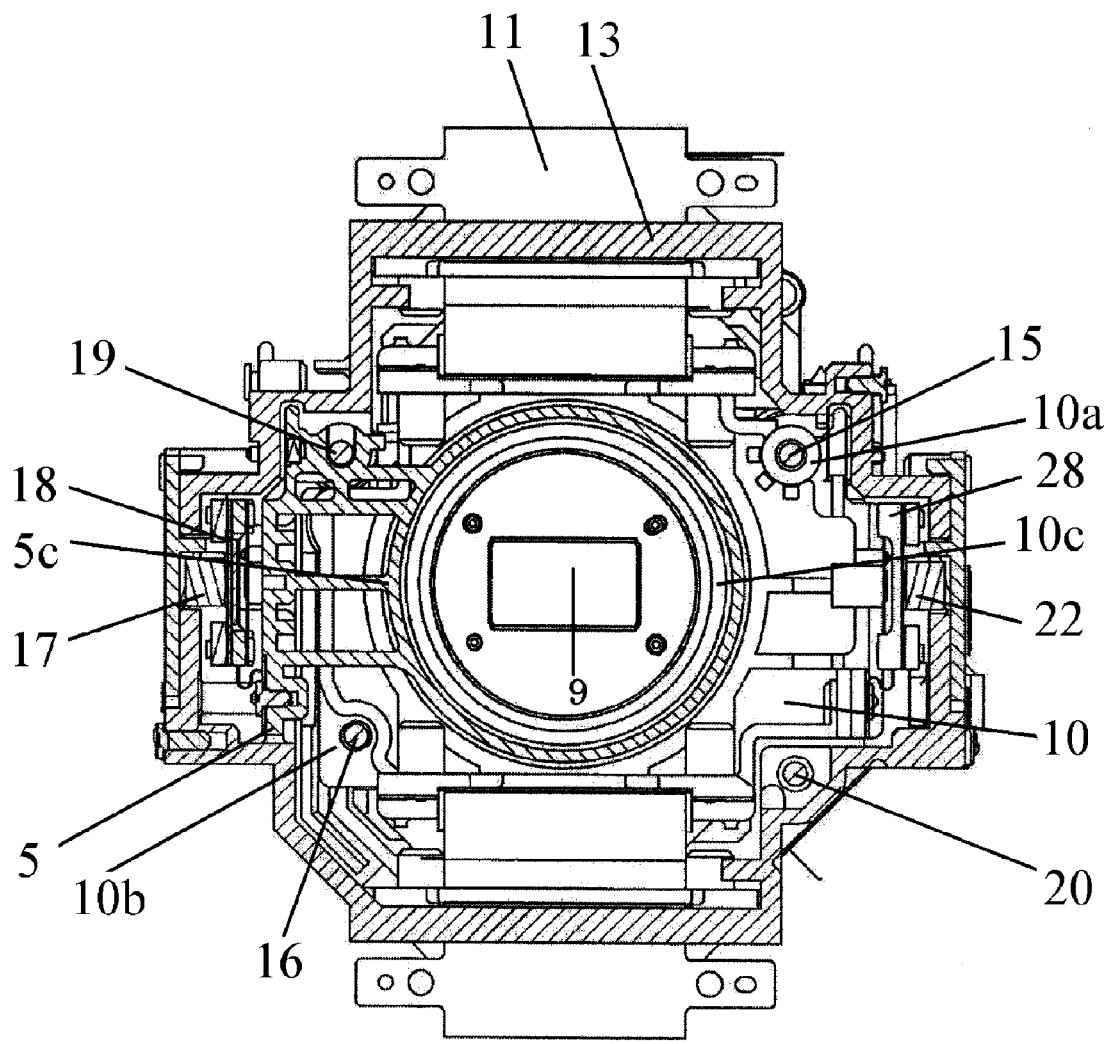
FIG. 3 is a cross-sectional view of the lens barrel part of the video camera of the embodiment viewed from an object side.

FIGS. 1, 2 and 3 show a configuration of a lens barrel part of a video camera as an image pickup apparatus, which is an embodiment of the present invention.

The lens barrel part houses an image taking optical system that causes light from an object (not shown) to form an object image. The image taking optical system is constituted by five lens units including, in order from an object side to an image surface side, positive, negative, positive, negative and positive lens units. In the following description, the object side is also referred to as a "front side", and the image surface side (or an image pickup element side) is also referred to as a "rear side".

In FIG. 2, in order from the object side (from a left side in the figure), reference character L1 denotes a first lens unit that is fixed, and reference characters L2 and L3 respectively denote a second lens unit and a third lens unit that are moved in an optical axis direction of the image taking optical system to perform zooming. Reference character L4 denotes a fourth lens unit that is shifted in a direction orthogonal to the optical axis direction to perform image stabilization (image shake correction). The direction orthogonal to the optical axis direction is hereinafter referred to as a "lens radial direction". Reference character L5 denotes a fifth lens unit that is moved in the optical axis direction to perform focusing. The fifth lens unit L5 corresponds to an "image surface side lens unit" that is disposed closest to an optical filter, which will be described later, among the five lens units L1 to L5.

Reference numeral 1 denotes a front barrel that holds the first lens unit L1. Three cam followers 1a are provided on an outer circumference of the front barrel 1 at a 120-degree circumferential interval. The three cam followers 1a respectively engage with three through-hole portions 12a formed in a fixed barrel 12 at a 120-degree circumferential interval. The engagement of the cam followers 1a with the through-hole portions 12a and fit of an outer circumferential surface 1b of the front barrel 1 to an inner circumferential surface 12b of the fixed barrel 12 enable positioning and holding of the front barrel 1 (that is, the first lens unit L1).

Reference numeral 2 denotes a second movable frame that holds the second lens unit L2, and reference numeral 3 denotes a third movable frame that holds the third lens unit L3. Reference numeral 4 denotes an image stabilization unit (image shake correction unit) that shifts the fourth lens unit L4 in the lens radial direction. The image stabilization unit 4 is positioned and fixed to the fixed barrel 12. Reference numeral 5 denotes a fifth movable frame (lens holding member) that holds the fifth lens unit L5.

Reference numeral 8 denotes an image pickup element that photoelectrically converts an optical image formed by the light that has passed through the optical filter described later and outputs electrical signals corresponding to the optical image. The image pickup element 8 is constituted by a CCD sensor, a CMOS sensor or the like. Reference numeral 6 denotes an aperture stop that adjusts an intensity of light passing through the image taking optical system to reach the image pickup element 8.

Reference numeral 9 denotes the optical filter having an infrared cutting function and an optical low-pass filter function. The optical filter 9 is disposed further on the front side than a light-receiving surface of the image pickup element 8 (that is, between the image pickup element 8 and the fifth lens unit L5). Reference numeral 10 denotes an image pickup element holding frame (image pickup element holding member) that holds the image pickup element 8 together with the optical filter 9. The image pickup element 8, the optical filter 9 and the image pickup element holding frame 10 constitute an image pickup element unit.

The image pickup element holding frame 10 (that is, the image pickup element unit) is moved in the optical axis direction by an image pickup element drive mechanism which will be described later. The movement of the second and third lens units L2 and L3 in the optical axis direction and the movement of the image pickup element holding frame 10 in the same direction perform zooming.

Reference numeral 7 denotes a focus base that is positioned and fixed to a rear barrel 13. Two straight guide members 19 and 20 are fixed between the rear barrel 13 and the focus base 7.

A sleeve portion 5a formed on the fifth movable frame 5 engages with the straight guide member 19 in a movable manner in the optical axis direction, and thereby the fifth movable frame 5 is guided in that direction. A U-shaped groove portion 5b formed on the fifth movable frame 5 engages with the straight guide member 20 in a movable manner in the optical axis direction, and thereby the fifth movable frame 5 is prevented from rotating around the straight guide member 19.

Reference numeral 22 denotes a slider (contact member) formed by bonding a magnet and a friction material. The slider 22 is positioned and fixed to the rear barrel 13. A vibrator 28 is positioned and fixed to the fifth movable frame 5, the vibrator 28 being constituted by an electromechanical energy conversion element and a plate-shaped elastic member on which vibration is excited by the electromechanical energy conversion element.

The elastic member of the vibrator 28 is formed of a ferromagnetic material. The elastic member (ferromagnet) and the magnet of the slider 22 are attracted to each other, and thereby a press-contact surface of the friction material of the slider 22 and press-contact surfaces formed at two places in the optical axis direction on the elastic member of the vibrator 28 are press-contacted to each other.

In this vibration type linear actuator constituted by the slider 22 and the vibrator 28, two periodic signals (pulse signals or alternating signals) whose phases are shifted from each other are input to the electromechanical energy conversion element through a flexible printed wiring board (not shown). This generates elliptic motion on each of the press-contact surfaces of the vibrator 28, which generates a driving force in the optical axis direction on the press-contact surface of the slider 22. The driving force moves the fifth movable frame 5 in the optical axis direction. This vibration type linear actuator constitutes a fifth movable frame drive mechanism.

Reference numeral 11 denotes an image pickup element flexible printed wiring board (FPC) through which electrical signals are input to and output from the image pickup element 8 held by the image pickup element holding frame 10.

Reference numeral 14 denotes a rear cover that is positioned and fixed to a rear portion of the rear barrel 13. Two straight guide members 15 and 16 are fixed between the rear barrel 13 and the rear cover 14. A sleeve portion 10a formed on the image pickup element holding frame 10 engages with the straight guide member 15 in a movable manner in the optical axis direction, and thereby the image pickup element holding frame 10 is guided in that direction. A U-shaped groove portion 10b formed on the image pickup element holding frame 10 engages with the straight guide member 16 in a movable manner in the optical axis direction, and thereby the image pickup element holding frame 10 is prevented from rotating around the straight guide member 15.

The image pickup element FPC 11 is bent so as to enable the movement of the image pickup element holding frame 10 in the optical axis direction, and is disposed between an inner circumferential surface of the rear barrel 13 and an outer circumferential surface of the image pickup element holding frame 10.

Reference numeral 17 denotes a slider (contact member) formed by bonding a magnet and a friction material. The slider 17 is positioned and fixed to the rear barrel 13. A vibrator 18 is positioned and fixed to the image pickup element holding frame 10, the vibrator 18 being constituted by an electromechanical energy conversion element and a plate-shaped elastic member on which vibration is excited by the electromechanical energy conversion element.

The elastic member of the vibrator 18 is formed of a ferromagnetic material. The elastic member (ferromagnet) and the magnet of the slider 17 are attracted to each other, and thereby a press-contact surface of the friction material of the slider 17 and press-contact surfaces formed at two places in the optical axis direction on the elastic member of the vibrator 18 are press-contacted to each other.

In this vibration type linear actuator constituted by the slider 17 and vibrator 18, two periodic signals (pulse signals or alternating signals) whose phases are shifted from each other are input to the electromechanical energy conversion element through a flexible printed wiring board (not shown). This generates elliptic motion on each of the press-contact surfaces of the vibrator 18, which generates a driving force in the optical axis direction on the press-contact surface of the slider 17. The driving force moves the image pickup element holding frame 10 in the optical axis direction. The vibration type linear actuator constitutes an image pickup element drive mechanism.

Figure 4A:
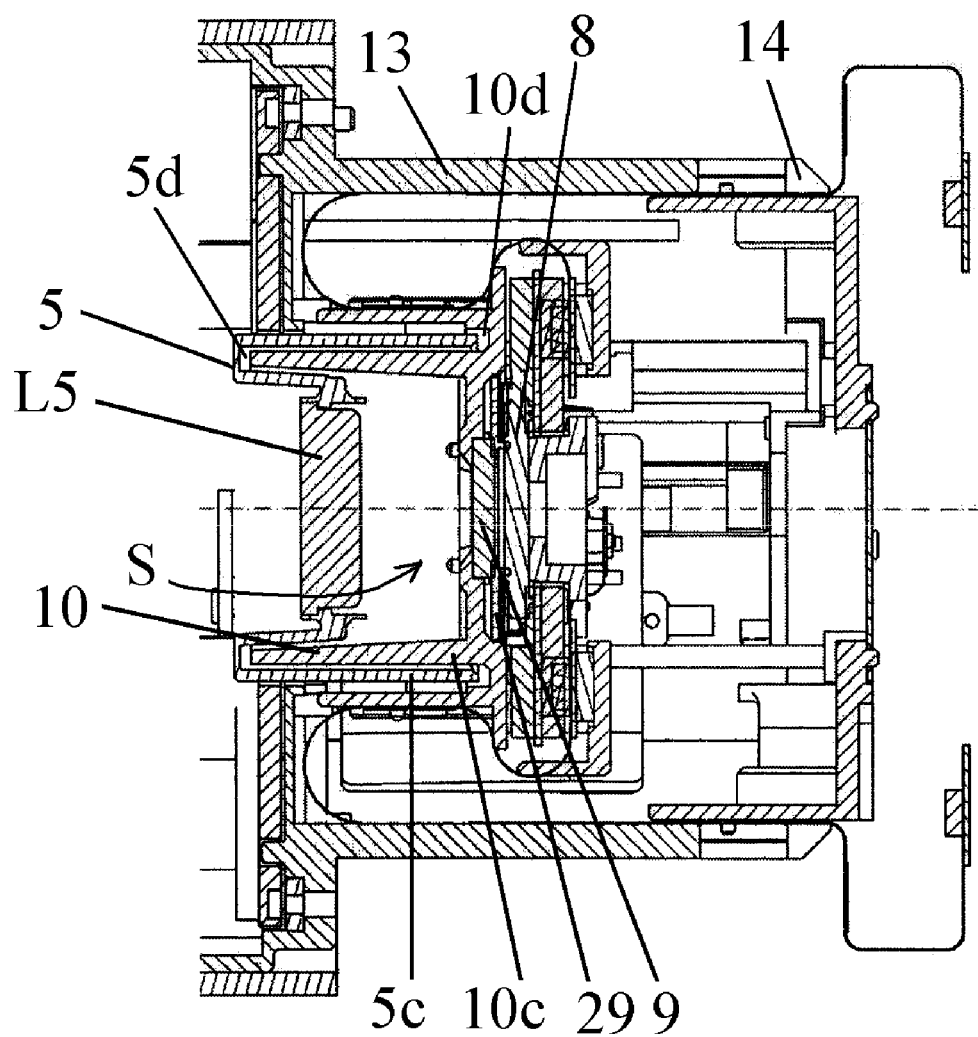
FIGS. 4A and 4B are cross-sectional views of a fifth lens unit and an image pickup element unit in the video camera of the embodiment.
Figure 4B:
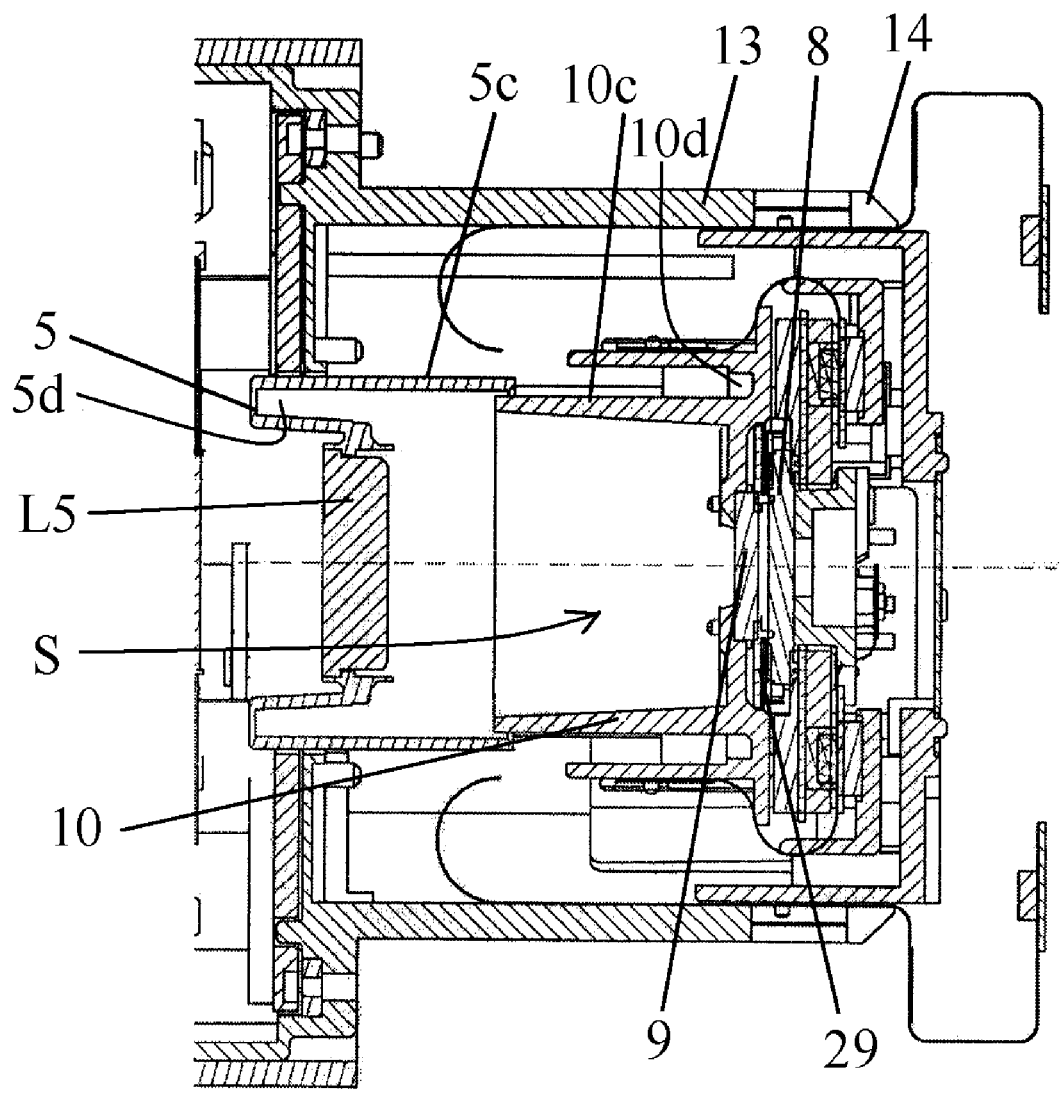

Next, description will be made of a dust-proof structure in this embodiment that prevents foreign substances from attaching onto a front surface (object side surface) of the optical filter 9 with reference to FIGS. 4A and 4B. FIGS. 4A and 4B respectively show a state where a distance in the optical axis direction between the fifth movable frame 5 and the image pickup element holding frame 10 is shortest and a state where the distance therebetween is longest. In other words, the fifth movable frame 5 and the image pickup element holding frame 10 are moved relativity to each other within a range between the closest state shown in FIG. 4A and the most-separated state shown in FIG. 4B.

The optical filter 9 and the image pickup element 8 are held by the image pickup element holding frame 10 such that their peripheries are surrounded by the image pickup element holding frame 10, and thereby a space between a rear surface (image pickup element side surface) of the optical filter 9 and the light-receiving surface of the image pickup element 8 is sealed. Thus, the foreign substances cannot invade the space from an outside area, which prevents the foreign substances from attaching onto the rear surface of the optical filter 9 and the light-receiving surface of the image pickup element 8.

On the other hand, on the fifth movable frame 5, a dust-proof wall 5c is formed which extends rearward (that is, in a direction toward the image pickup element holding frame 10). Moreover, on the image pickup element holding frame 10, a dust-proof wall 10c is formed which extends forward (that is, in a direction toward the fifth movable frame 5). The dust-proof walls 5c and 10c mutually overlap in the lens radial direction within the entire range where the fifth movable frame 5 and the image pickup element holding frame 10 are moved relativity to each other to surround a space S between a rear surface of the fifth lens unit L5 and the front surface of the optical filter 9 (the space S is hereinafter referred to as a "lens-filter interspace S"). In other words, the dust-proof walls 5c and 10c maintain a state where the lens-filter interspace S is enclosed by a so-called nested structure (or an embedded structure) in which the dust-proof wall 10c is telescopically inserted into an inner area of the dust-proof wall 10c, even if the fifth movable frame 5 and the image pickup element holding frame 10 are moved relativity to each other.

Such a dust-proof structure enables prevention of invasion of the foreign substances into the lens-filter interspace S from the outside area such as an external area of the lens barrel part and attachment thereof onto the front surface of the optical filter 9. This makes it possible to prevent images of the foreign substances attached onto the front surface of the optical filter 9 from being included in a captured image.

Although the dust-proof wall 5c formed on the fifth movable frame 5 is disposed further outside than the dust-proof wall 10c formed on the image pickup element holding frame 10 in this embodiment, the dust-proof wall 10c may be disposed further outside than the dust-proof wall 5c.

At an inside of a base end portion of the dust-proof wall 5c on the fifth movable frame 5 and at an outside of a base end portion of the dust-proof wall 10c on the image pickup element holding frame 10, concave portions 5d and 10d are formed which respectively recede to the object side and to the image surface side. These concave portions 5d and 10d are provided, as shown in FIG. 4A, to avoid interference of the fifth movable frame 5 and a tip of the dust-proof wall 10c and interference of the image pickup element holding frame 10 and a tip of the dust-proof wall 5c when the fifth movable frame 5 and the image pickup element holding frame 10 come close to each other.

Friction between the sliders 17 and 22 and the vibrators 18 and 28 in the vibration type actuator generates abrasion powder. Moreover, slide of the sleeve portions 5a and 10a and the U-shaped portions 5b and 10b of the fifth movable frame 5 and the image pickup element holding frame 10 with respect to the straight guide members 15, 16, 19 and 20 may also generate abrasion powder.

Therefore, this embodiment forms the dust-proof walls 5c and 10c further inside in the lens radial direction than the straight guide members 15, 16, 19 and 20 and the vibration type actuators (that is, the sliders 17 and 22 and the vibrators 18 and 28). Such a configuration enables prevention of invasion of foreign substances such as the abrasion powder generated inside the lens barrel part as described above into the lens-filter interspace S and attachment thereof onto the front surface of the optical filter 9.

Between an inner circumferential surface of the dust-proof wall 5c and an outer circumferential surface of the dust-proof wall 10c, a small clearance (gap) is provided. This clearance can avoid generation of abrasion powder due to slide of the dust-proof walls 5c and 10c. The clearance can also avoid increase of driving load of the fifth movable frame 5 and the image pickup element holding frame 10 in the optical axis direction due to the slide of the dust-proof walls 5c and 10c. Furthermore, the clearance can provide a passageway of air into and from the lens-filter interspace S when a volume of the lens-filter interspace S is increased and decreased with the movement of the fifth movable frame 5 and the image pickup element holding frame 10 in the optical axis direction.

However, grease or viscosity agent may be applied between the inner circumferential surface of the dust-proof wall 5c and the outer circumferential surface of the dust-proof wall 10c with formation of an air passageway covered by an air-pervious filter that is impervious to the foreign substances on at least one of the dust-proof walls 5c and 10c. This makes it possible to effectively prevent the foreign substances from invading the lens-filter interspace S through the clearance.

Although the above embodiment described the case where both the lens holding member (fifth movable frame 5) and the image pickup element holding member (image pickup element holding frame 10) are moved in the optical axis direction, alternative embodiments of the present invention include a case where only one of the lens holding member and the image pickup element holding member is moved (that is, the lens holding member and the image pickup element holding member are moved relatively to each other) in the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-034243, filed Feb. 19, 2010 which is hereby incorporated by reference herein in its entirety.

What is claimed is:

1. An image pickup apparatus comprising:
   an image taking optical system configured to cause light to form an optical image;
   an optical filter into which the light from the image taking optical system enters;
   an image pickup element configured to electrically convert the optical image formed by the light that has passed through the optical filter;
   an image pickup element holding member configured to hold the image pickup element and the optical filter;
   a lens holding member configured to hold an image surface side lens unit that is disposed closest to the optical filter among lens units included in the image taking optical system;
   a drive mechanism configured to move at least one holding member of the lens holding member and the image pickup element holding member in the optical axis direction; and
   a guide member configured to guide the at least one holding member in the optical axis direction, wherein the lens holding member and the image pickup element holding member are moved relatively to each other in an optical axis direction of the image taking optical system, wherein the lens holding member and the image pickup element holding member include dust-proof walls that surround a space between the image surface side lens unit and the optical filter and mutually overlap in all directions orthogonal to the optical axis direction in an entire range where the lens holding member and the image pickup element holding member are moved relatively to each other, and wherein the dust-proof walls are formed further inside in the directions orthogonal to the optical axis direction than the drive mechanism and the guide member.

2. An image pickup apparatus according to claim 1, further comprising:

an image pickup element drive mechanism that moves the image pickup element holding member in the optical axis direction.

* * * * *